US012664446B1

(12) United States Patent
Hajizadeh

(10) Patent No.: US 12,664,446 B1
(45) Date of Patent: Jun. 23, 2026

(54) GENERATING MACHINE LEARNING MODEL HOST SYSTEM RECOMMENDATIONS USING MULTI-OBJECTIVE OPTIMIZATION

(71) Applicant: Amazon Technologies, Inc., Seattle, WA (US)

(72) Inventor: Yasin Hajizadeh, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 570 days.

(21) Appl. No.: 18/336,809

(22) Filed: Jun. 16, 2023

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ................................. G06N 5/04; G06N 20/00
USPC .......................................................... 706/46
See application file for complete search history.

(56) References Cited

U.S. PATENT DOCUMENTS

| | | | | |
|---|---|---|---|---|
| 11,128,696 B2 * | 9/2021 | Featonby | ............ | H04L 67/1008 |
| 11,360,795 B2 * | 6/2022 | Featonby | .............. | G06F 9/5027 |
| 11,372,663 B2 * | 6/2022 | Featonby | .............. | G06F 9/5027 |
| 11,605,021 B1 * | 3/2023 | Khare | .................... | G06N 5/046 |
| 11,614,963 B2 * | 3/2023 | Jia | ....................... | G06F 9/44505 |
| | | | | 718/105 |
| 11,720,846 B2 * | 8/2023 | Durvasula | ................ | G06N 7/01 |
| | | | | 706/45 |
| 12,159,238 B2 * | 12/2024 | Appel | .................... | G06N 3/082 |
| 12,231,304 B2 * | 2/2025 | Illikkal | ............... | H04L 41/5019 |
| 12,511,219 B2 * | 12/2025 | Padmanabha | ....... | G06F 11/3442 |
| 2019/0317760 A1 | 10/2019 | Kessentini | | |
| 2020/0310852 A1 * | 10/2020 | Featonby | .............. | G06F 9/5077 |

(Continued)

FOREIGN PATENT DOCUMENTS

TW          M639697 U    *    4/2023

OTHER PUBLICATIONS

Yingcan Wei "A GPU-specialized Inference Parameter Server for Large-Scale Deep Recommendation Models" Sep. 2022.*

(Continued)

*Primary Examiner* — Samson B Lemma

(74) *Attorney, Agent, or Firm* — S. Scott Foster; Kowert, Hood, Munyon, Rankin & Goetzel, P.C.

(57) ABSTRACT

Machine learning model host system recommendations may be generated using multi-objective optimization. A machine learning model and an example payload of an inference request used to generate an inference using the machine learning model may be identified for a machine learning model host system recommendation. Multi-objective optimization may be iteratively performed that at starts from an initial set of host systems as a recommendation set of host systems for the host system recommendation, minimizes resource utilization, and maximizes inference throughput for the example payload. A Pareto front is determined for host systems in a recommendation set according to a mapping function to objective space that takes as input respective configuration parameters for different host systems being considered in a recommendation set of host systems to generate the respective inference throughput values and resource utilization values. The host system recommendation may be provided based on the Pareto front of host systems.

20 Claims, 9 Drawing Sheets

(56)          References Cited

U.S. PATENT DOCUMENTS

| | | | | |
|---|---|---|---|---|
| 2020/0310853 | A1* | 10/2020 | Featonby | G06F 9/45558 |
| 2020/0310876 | A1* | 10/2020 | Featonby | G06F 9/5088 |
| 2020/0314171 | A1* | 10/2020 | Featonby | G06F 9/45558 |
| 2022/0035878 | A1 | 2/2022 | Sarah | |
| 2022/0100558 | A1* | 3/2022 | Jia | G06N 20/00 |
| 2022/0188663 | A1* | 6/2022 | Appel | G06N 3/082 |
| 2022/0291941 | A1* | 9/2022 | Featonby | G06F 9/5077 |
| 2022/0413891 | A1* | 12/2022 | Featonby | G06F 9/5077 |
| 2023/0047295 | A1* | 2/2023 | Martinez | G06F 11/3409 |
| 2023/0177441 | A1* | 6/2023 | Durvasula | G06N 3/08 |
| | | | | 706/45 |
| 2023/0342278 | A1* | 10/2023 | Padmanabha Iyer | |
| | | | | G06F 11/3442 |
| 2025/0021837 | A1* | 1/2025 | He | G06N 5/01 |

OTHER PUBLICATIONS

E. Zio et al, "A clustering procedure for reducing the number of representative solutions in the Pareto Front of multiobjective optimization problems" May 1, 2011, 624-634, VL-210, European Journal of Operational Research.
Mrs. P.M. Chaudhari et al, "Computing the Most Significant Solution from Pareto Front obtained in Multi-objective Evolutionary" vol. 1. No 4.. dated Oct. 2010.
Zitzler, Eckart et al, "An evolutionary algorithm for multi objective optimization: the strength Pareto approach" No. 43, May 1998.

* cited by examiner

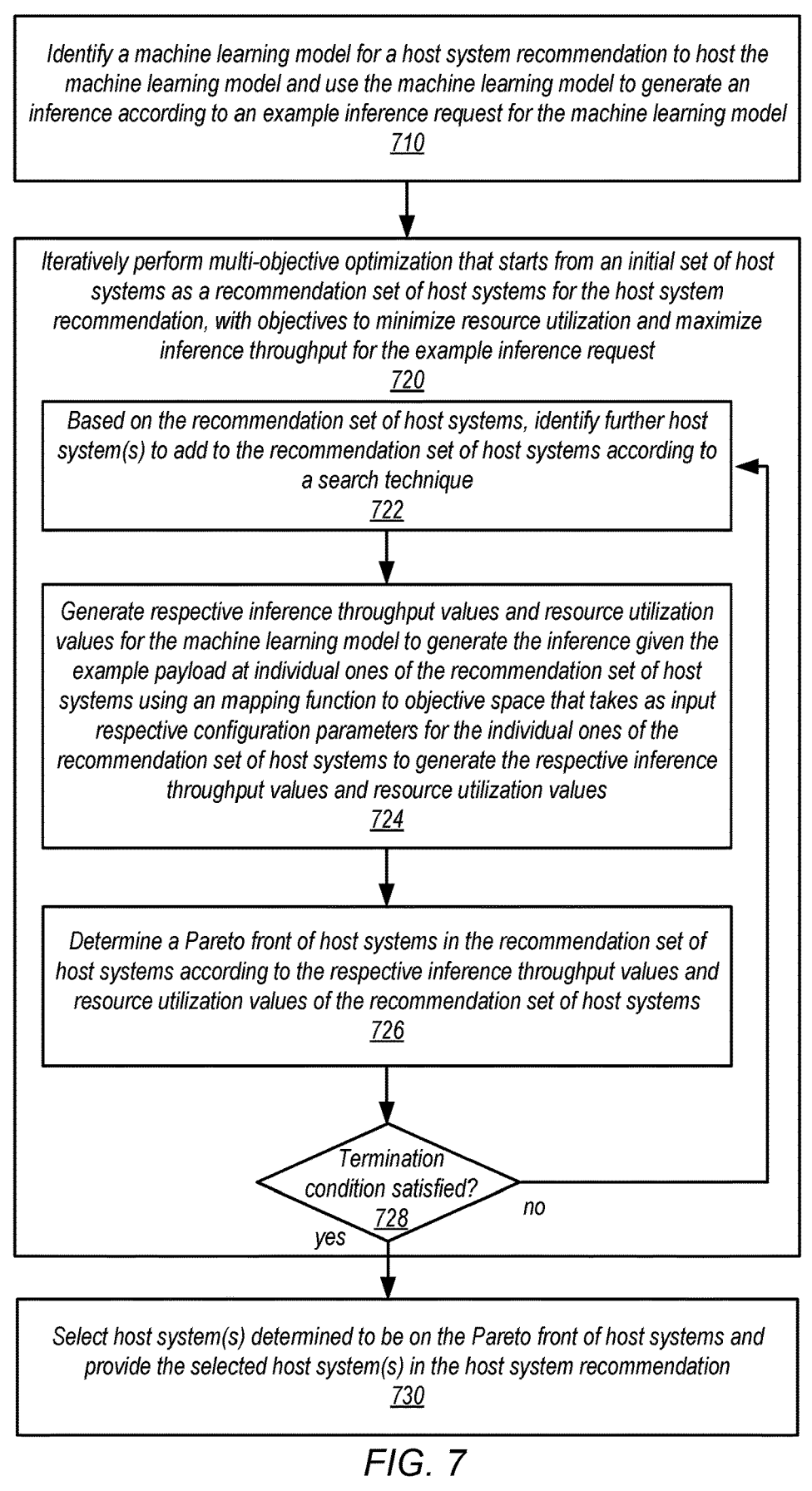

*Identify a machine learning model for a host system recommendation to host the machine learning model and use the machine learning model to generate an inference according to an example inference request for the machine learning model*
710

*Iteratively perform multi-objective optimization that starts from an initial set of host systems as a recommendation set of host systems for the host system recommendation, with objectives to minimize resource utilization and maximize inference throughput for the example inference request*
720

*Based on the recommendation set of host systems, identify further host system(s) to add to the recommendation set of host systems according to a search technique*
722

*Generate respective inference throughput values and resource utilization values for the machine learning model to generate the inference given the example payload at individual ones of the recommendation set of host systems using an mapping function to objective space that takes as input respective configuration parameters for the individual ones of the recommendation set of host systems to generate the respective inference throughput values and resource utilization values*
724

*Determine a Pareto front of host systems in the recommendation set of host systems according to the respective inference throughput values and resource utilization values of the recommendation set of host systems*
726

*Termination condition satisfied?*
728

*no*

*yes*

*Select host system(s) determined to be on the Pareto front of host systems and provide the selected host system(s) in the host system recommendation*
730

*FIG. 7*

GENERATING MACHINE LEARNING MODEL HOST SYSTEM RECOMMENDATIONS USING MULTI-OBJECTIVE OPTIMIZATION

BACKGROUND

Machine-learned models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

BRIEF DESCRIPTION OF THE DRAWINGS

FIG. 7 is a high-level flowchart illustrating various methods and techniques for generating machine learning model host system recommendations using multi-objective optimization, according to some embodiments.

Figure 1:
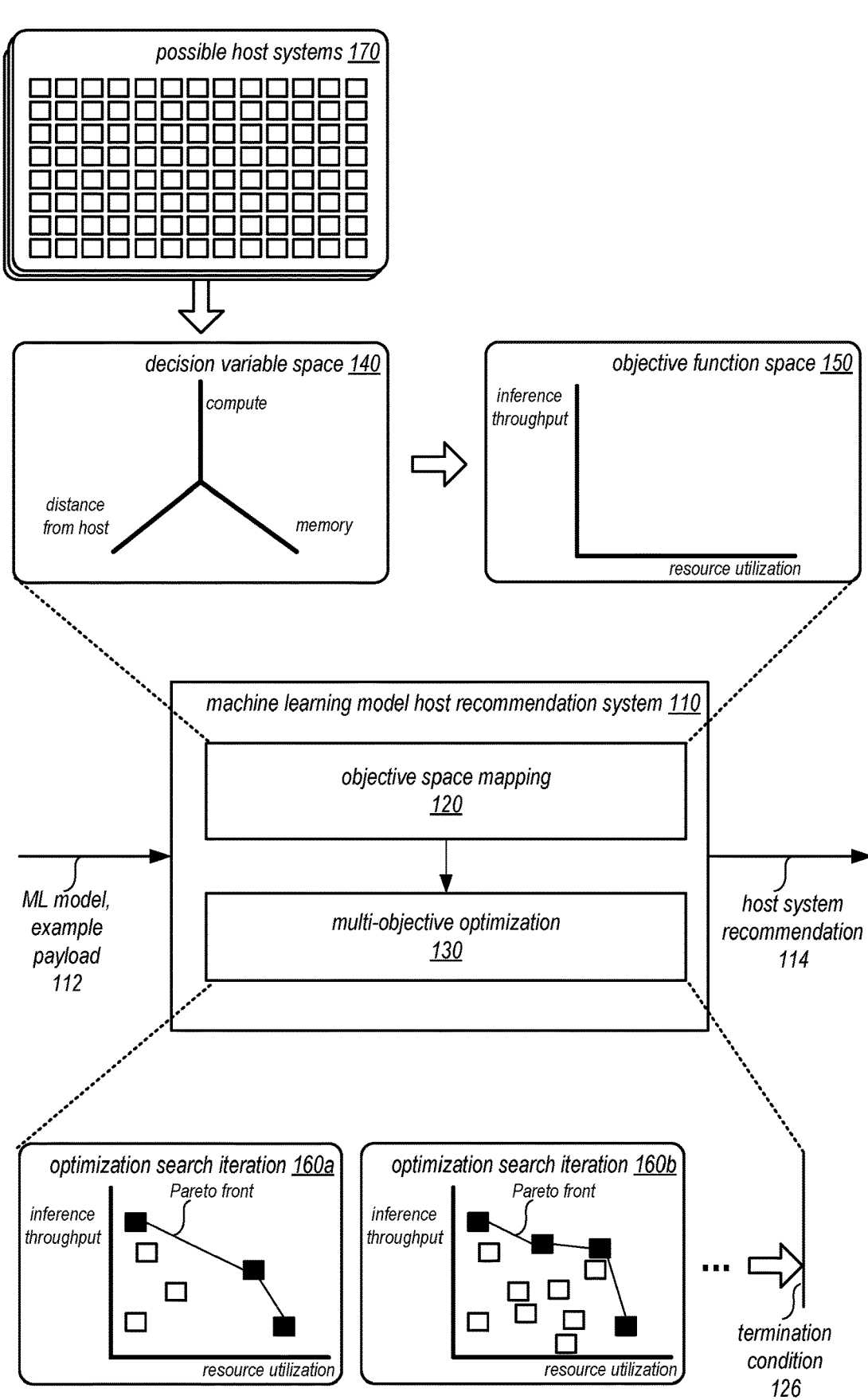
FIG. 1 is a logical block diagram that illustrates generating machine learning model host system recommendations using multi-objective optimization, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques generating machine learning model host system recommendations using multi-objective optimization are described herein. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. Computer vision machine learning models, for example, may be trained using training data sets of image data and may also make inferences to perform various computer vision tasks, such as image classification, object detection, or image regression, among others.

A variety of cloud providers and other hosting services for machine learning models offer many different configurations and capabilities of host systems for training machine learning models, deploying machine learning models, and generating inferences using machine learning models under different workloads. Because of the large number of possible host systems, selecting the optimal instance type for machine learning inferencing can be challenging. Selecting a sub-optimal host system can result in degraded system, service, or application performance that utilizes the machine learning model or, in the event the model system is not fully utilized, wasted computing resources. Because machine learning models are often provided to machine learning developers as a black box, their performance characteristics cannot be easily evaluated. Moreover, even if a machine learning model designer has an understanding of the machine learning model performance on one kind of workload, different uses with different workloads may have different performance characteristics and may be sub-optimally placed on a same host system for the same machine learning model that was optimal for the machine learning model designer. Therefore, discovering the right host system for a machine learning model for a particular workload offers a technical challenge to the development of systems, services, or applications that utilize machine learning models.

In various embodiments, techniques for generating machine learning model host system recommendations using multi-objective optimization provide fast and accurate solution for discovering optimal machine learning model host systems. Because multi-objective optimization is used, analysis techniques, such as Pareto front, can be applied to easily identify tradeoffs between different configurations of host systems, allowing a machine learning model developer to understand and select an optimal host system for the workload and larger system, service, or application for which a machine learning model is being deployed. Instead of waiting on costly benchmark analysis, multi-objective optimization makes use of a mapping function to objective space that can maximize the inference throughput and minimize resource utilization for a machine learning model to quickly identify host systems to recommend. Moreover, the machine learning model developer may only have to identify the machine learning model and provide an example payload in order to generate a host system recommendation.

FIG. 1 is a logical block diagram that illustrates generating machine learning model host system recommendations using multi-objective optimization, according to some embodiments. Machine learning model host recommendation system 110 may be a stand-alone recommendation system (e.g., implemented as a tool for evaluating different host system configurations for a machine learning model and workload) or as part of a larger application, system, or service, such as providing machine learning model host system recommendations for provider network host systems offered using different types of computing system resources (e.g., different instance, container, or other virtualized or non-virtualized computing resources offered by a provider network with different hardware capabilities). Machine learning model host recommendation system 110 may receive requests or otherwise obtain a machine learning model and example payload (e.g., the data input to the machine learning model, such as the text, image, video, audio, or various other types of data) used to generate an inference for the payload using the machine learning model. Machine learning model system 110 may implement techniques for generating machine learning model host system recommendations using multi-objective optimization and provide a host system recommendation 114.

For example, machine learning model host recommendation system 110 may implement objective space mapping 120, in various embodiments. Objective space mapping 120 may act as a mapping function that determines for a given host system of possible host systems 170 with respective configuration parameters (e.g., amount of processing capacity, memory, network capacity, specialized hardware, location of the resource, or scheduling or other operational configurations of the host system) that make up the decision variable space 140 and the ML model and example payload 112, respective values for the objectives being maximized (e.g., inference throughput) and minimized (e.g., resource utilization) in objective function space 150. Possible host systems 170 may be taken from various system resources or providers. For instance, as discussed in detail below with regard to FIG. 2, a provider network (or multiple different provider networks operated by different entities) may offer host systems which can be used for a machine learning model which can be considered by machine learning model host recommendation system 110.

Objective space mapping 120 may be implemented in various ways. For example, as discussed below with regard to FIG. 4, object space mapping 120 may be implemented using a performance prediction machine learning model that predicts the objective function space 150 values given the input machine learning model, example payload, and configuration parameters of a host system. In other embodiments, objective space mapping 120 may be implemented using comparison techniques that compare the machine learning model, example payload, and configuration parameters with historical data collected by benchmarking different workloads and machine learning models on possible host systems 170, such as the clustering techniques discussed as part of FIG. 5, which could be implemented as part of multi-objective optimization or as a stand-alone recommendation technique.

Machine learning model host recommendations system 110 may implement multi-objective optimization 130 to search amongst possible host systems 170 to determine host system recommendation 114 using objective space mapping 120. For example, as discussed in detail below with regard to FIGS. 5 and 7, multi-objective optimization may determine an initial recommendation set, using randomized selection from possible host systems 170, or, in some embodiments, using a clustering technique to determine the initial recommendation set. Multi-objective optimization 130 may perform, in iterative fashion, searching for new host systems to add to the recommendation set, and then updating the analysis of the recommendation set to determine which host system(s) to include in host system recommendation 114. As illustrated in FIG. 1, multiple search iterations, such as optimization search iteration 160a and 160b, may continue until a termination condition 126 is met. The termination condition 126 may include many different types of conditions, such as a time limit, a number of iterations, or a resource utilization limitation (e.g., a cost) for generating a host system recommendation, in some embodiments.

As part of each optimization search iteration, a Pareto front may be determined. A Pareto front may be determined according to Pareto-optimal situations (sometimes referred to as Pareto efficiency situations) in the objective function space. For example, a situation may be called Pareto optimal where no change can be found (e.g., in the configuration parameters) that leads to an improvement (e.g., greater maximization of inference throughput and minimization of resource utilization) where no action or allocation is available in the decision variable space 140 (e.g., a change to a configuration parameter of a host system) that makes a host system perform better in one objective without performing worse in the other objective (e.g., a change that increases inference throughput but causes greater resource utilization, or vice versa). A Pareto front may be determined as the set of each host system that is in a Pareto-optimal situation. As illustrated in FIG. 1, a Pareto front may be illustrated as an outer boundary of host systems mapped into the objective function space 150, where host systems not included on the Pareto-front would be excluded from a host system recommendation 114. In some embodiments, additional criteria may be used to devalue, penalize, or exclude host systems in a recommendation set (including removing them from a Pareto front or not considering them for a Pareto front), as discussed below with regard to FIG. 5. For instance, an unavailable host system for a particular user, operator, or one that is expressly excluded in a request for recommendation may be excluded.

The Pareto front of a most recent optimization search iteration may be used to generate host system recommendation after a termination condition 126 is satisfied, in some embodiments. For example, the Pareto front may be used to generate a list or set of host systems to include in host system recommendation 114 (where other host system configurations not on the Pareto front are not included). In some embodiments, the Pareto front may be visualized, or other visualizations may be provided, as discussed below with regard to FIGS. 6A-6C.

Please note that the previous description of is a logical illustration of a machine learning model host recommendation system and thus is not to be construed as limiting as to other embodiments of another system that can implement techniques for performing multi-objective optimization for generating host system recommendations for machine learning models given example payloads.

This specification continues with a general description of a provider network that implements multiple different services, including a machine learning service, which may implement generating machine learning model host system recommendations using multi-objective optimization. Then various examples of, including different components, or arrangements of components that may implement generating machine learning model host system recommendations using multi-objective optimization are discussed. A number of different methods and techniques to implement generating machine learning model host system recommendations using multi-objective optimization are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
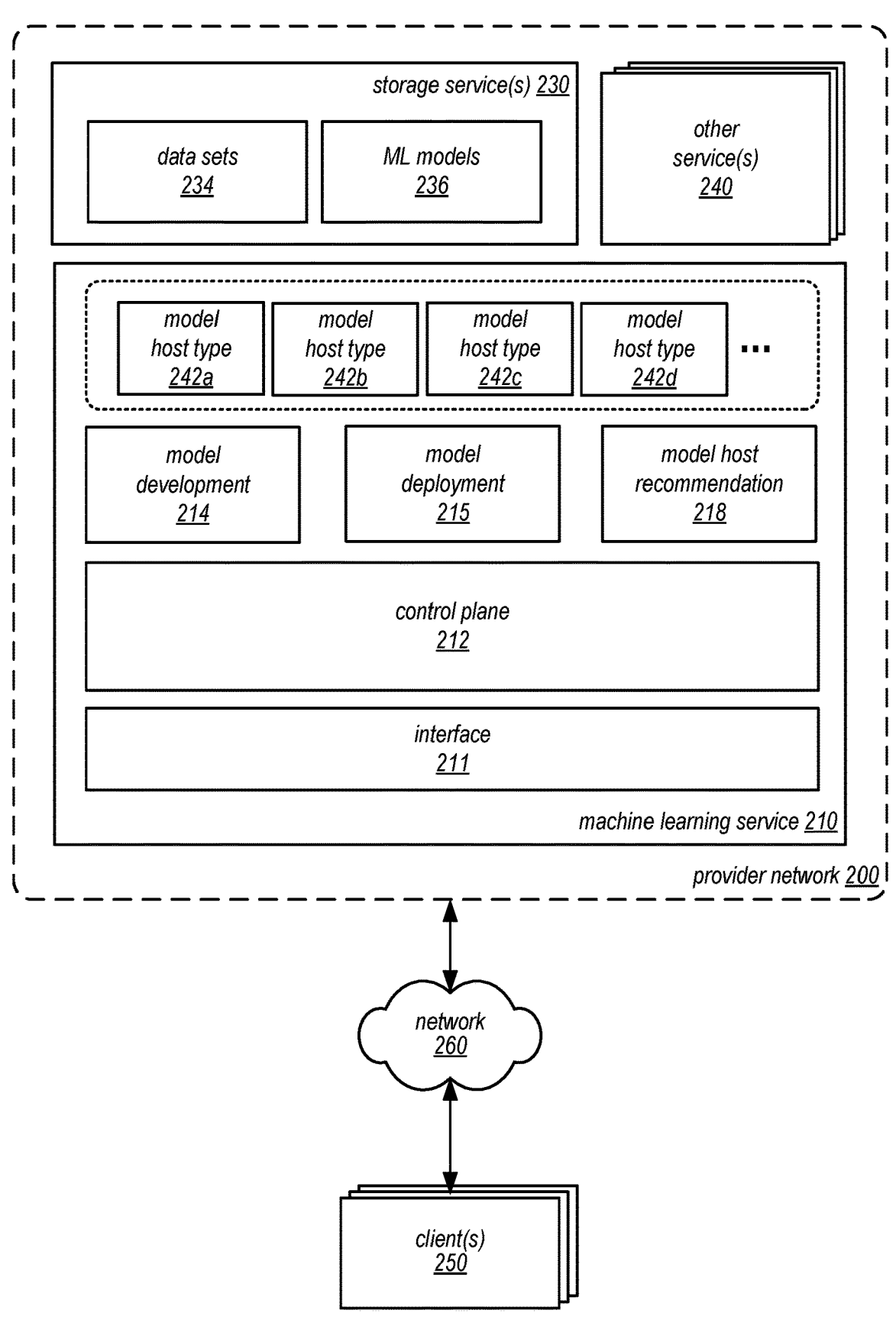
FIG. 2 is a logical block diagram that illustrates an example provider network that may implement a machine learning service that implements generating machine learning model host system recommendations using multi-objective optimization, according to some embodiments.

FIG. 2 is a logical block diagram that illustrates an example provider network that may implement a machine learning service that implements generating machine learning model host system recommendations using multi-objective optimization, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as machine learning service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within provider network 200, such as a client application hosted on another provider network service like an event driven code execution service or virtual compute service) to train and deploy machine learning models and techniques (e.g., neural networks, support vector machines, random forests, regression, q-learning, and so on) and/or obtain model host recommendations for machine learning models. For example, machine learning service 210 may implement interface 211 (e.g., a graphical user interface, programmatic interface that implements Application Program Interfaces (APIs) and/or a command line interface) may be implemented so that a client can submit, edit, or otherwise implement various different model development, deployment, host system recommendation or other management requests. For example, interface 211 may include development and deployment environment, which may provide a training script or other code editor with various development tools to create, submit, and/or monitor machine learning pipeline with a training job and/or monitoring job, as discussed below. Development and management environment may be a graphical interface, in some embodiments, and may provide an interface to past results generated for other models, in some embodiments. Similarly, a model host recommendation 218 may provide various graphical user interface features for specifying recommendation requests, as discussed below with regard to FIG. 3 and provide results, such as those discussed with regard to FIGS. 6A-6C. Interface 211 may also allow a client to request the performance of training, deployment (e.g., on a recommended model host system), or other machine learning service features, in various embodiments.

Machine learning service 210 may implement a control plane 212 to perform various control operations to implement the features of machine learning service 210. For example, control plane may monitor the health and performance of requests at different components, such as training as part of model development, execution of machine learning models as part of model deployment 215. For example, if a node or other component fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement model development 214 to develop, configure, program, define, and/or otherwise execute training jobs on various machine learning models using data sets, such as data sets 234 in storage services 230 across one or more training nodes (which may include one or more respective processing devices for training, such as GPUs). In some embodiments machine learning service 210 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, a development environment, and executed. Various tests or other development operations for machine learning models may also be performed. In some embodiments, the various files, configuration information, and other data for machine learning model development may be organized as a project (or other collection) and stored, versioned, or otherwise managed by model development 214 (e.g., as a collection of one or more files or data objects in storage services 230, including data sets 234 and ML models 236). Training jobs may be submitted to training nodes (e.g., via a development environment or other interfaces) to train machine learning models on identified data set(s).

In various embodiments, machine learning service 210 may implement model deployment 215, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of provider network 200 (e.g., a virtual compute service) and then the machine learning model deployed to that provisioned resource along with various software or other applications to support the receipt of requests for inferences and return inferences.

In some embodiments, machine learning models 236 may be trained and offered by their creators through machine learning service 210 as part of a catalog, registry, other collection of machine learning models that can be used by other entities (e.g., developers) for deployment as part of other applications or fine-tuning or adapting for specific use cases, among other scenarios. As discussed above with regard to FIG. 1, whether a model is developed and deployed by the same entity, or developed by one entity and obtained from the catalog for use by another entity, it may be difficult to ascertain the performance of a particular machine learning model for given workloads on different possible host systems. Model host recommendation 218 may be implemented, as discussed in detail below with regard to FIGS. 3-6C, which may provide recommendations for model host systems for use in model deployment 215, in various embodiments. In some embodiments, machine learning models may be provided from sources external to provider network 200 or provided by other service(s) 240.

Model host types 242a, 242b, 242c, and 242d, may offer many different configurations of computing resources that can be utilized to host a machine learning model to perform workloads as part of a system, service, or application. In some embodiments, model host types 242 may be implemented or managed directly by machine learning service 210, providing, for example, various virtual computing resources with different hardware and software capabilities for executing machine learning model workloads. In some embodiments, model host types 242 may include other computing resources, such as may be offered by other services 240, such as virtual compute service that offers computing resources as instances (e.g., virtual machines), containers (e.g., operating system-level virtualization), and/ or bare-metal systems (e.g., no virtualization). Again, each of these computing resources may have different hardware and software capabilities for executing machine learning model workloads. In some embodiments, model host systems of various model host types may be provided or implemented as part of external systems, services, or other provider networks (not illustrated).

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to obtain a machine learning model host recommendation, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to configure or perform machine learning tasks or obtain machine learning model host system recommendations) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and a provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
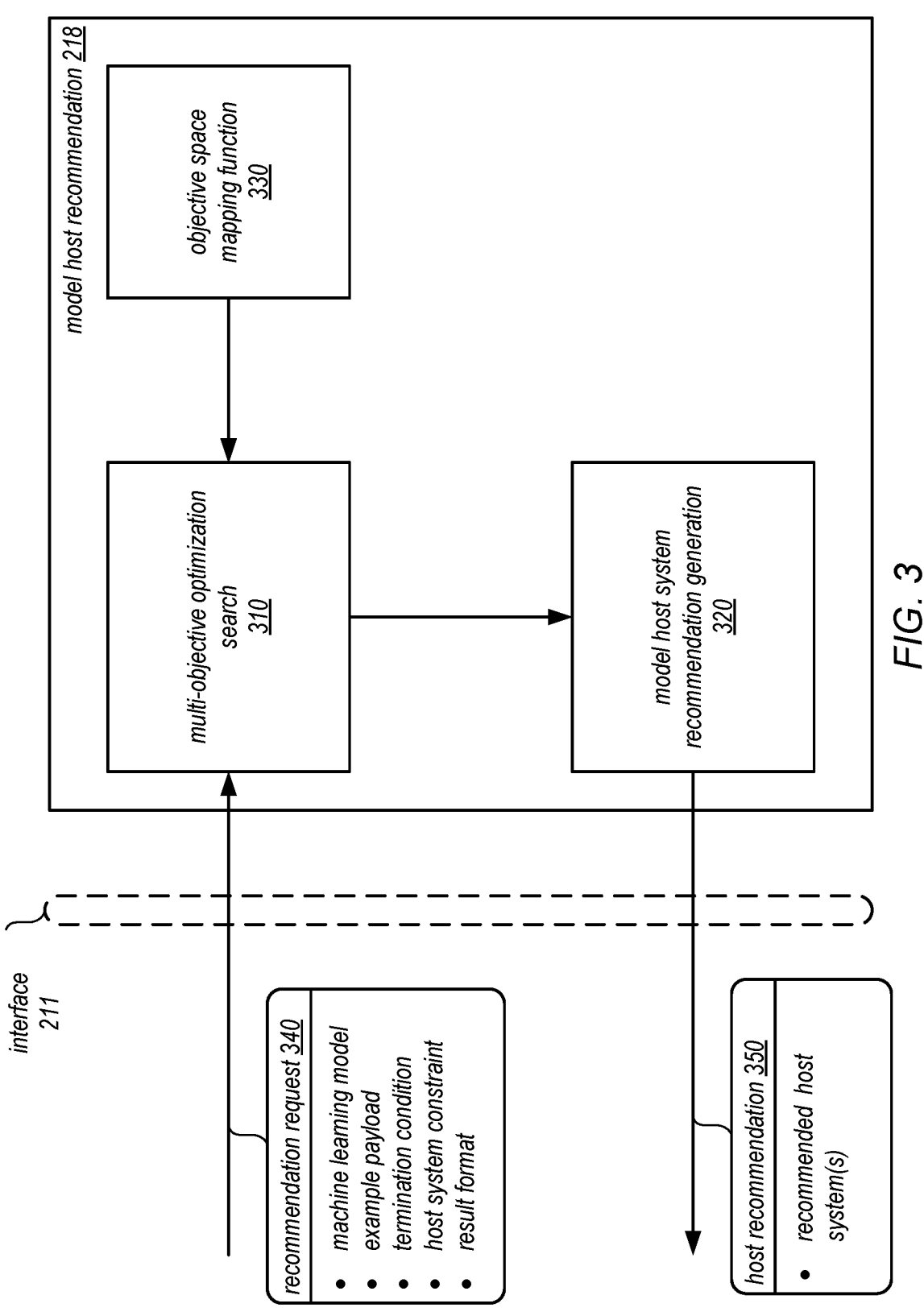
FIG. 3 is a logical block diagram that illustrates interactions with model host recommendation, according to some embodiments.

FIG. 3 is a logical block diagram that illustrates interactions with model host recommendation, according to some embodiments. As indicated at 340, a recommendation request may be received. The recommendation request 340 may specify various information for generating the model host system recommendation. For example, the machine learning model may be specified using a model identifier, registry or catalog entry, project identifier, or other information that specifies the machine learning model for generating the recommendation. An example payload may be specified, in some embodiments. An image, file, input string, audio data, time series data set, video data or any other input data that is used to generate an inference may be identified (e.g., via location, such as a file path, or network location identifier) or provided (e.g., included in the request). In some embodiments, recommendation request 340 may include the termination condition, such as a time limit, a number of iterations, or a resource utilization limitation (e.g., a cost) for generating a host system recommendation as discussed above. In some embodiments, a host system constraint may be specified. For example, resource utilization limitations (e.g., as may be specified by cost or other amount of resource utilization) may be specified to exclude or penalize recommendations that violate the limitation. In some embodiments, a result format can be specified for the recommendation (e.g., selecting a visualization, ranking or other way of organizing a recommendation).

As discussed in detail below with regard to FIGS. 4 and 5, multi-objective optimization search 310 may utilize objective space mapping function 330 to perform iterative searches and until the termination condition is met. Then, a Pareto front of host systems in a recommendation set may be provided to model host system recommendation generation 320 which may organize, rank, and/or otherwise provide host recommendation 350 with recommended host system (s) in response to request 340. In some embodiments, different visualizations may be provided, as discussed in detail below with regard to FIGS. 6A-6C.

In some embodiments, other recommendation techniques may also be utilized instead of or in addition to multi-objective optimization search. For instance, clustering techniques, similar to those discussed below with regard to FIG. 5, may be applied to determine host system recommendations by using an initial set of host systems determined within a cluster and then selecting one or more of the initial set of host systems to provide (e.g., based on historical performance of those initial set of host systems for similar payloads).

Figure 4:
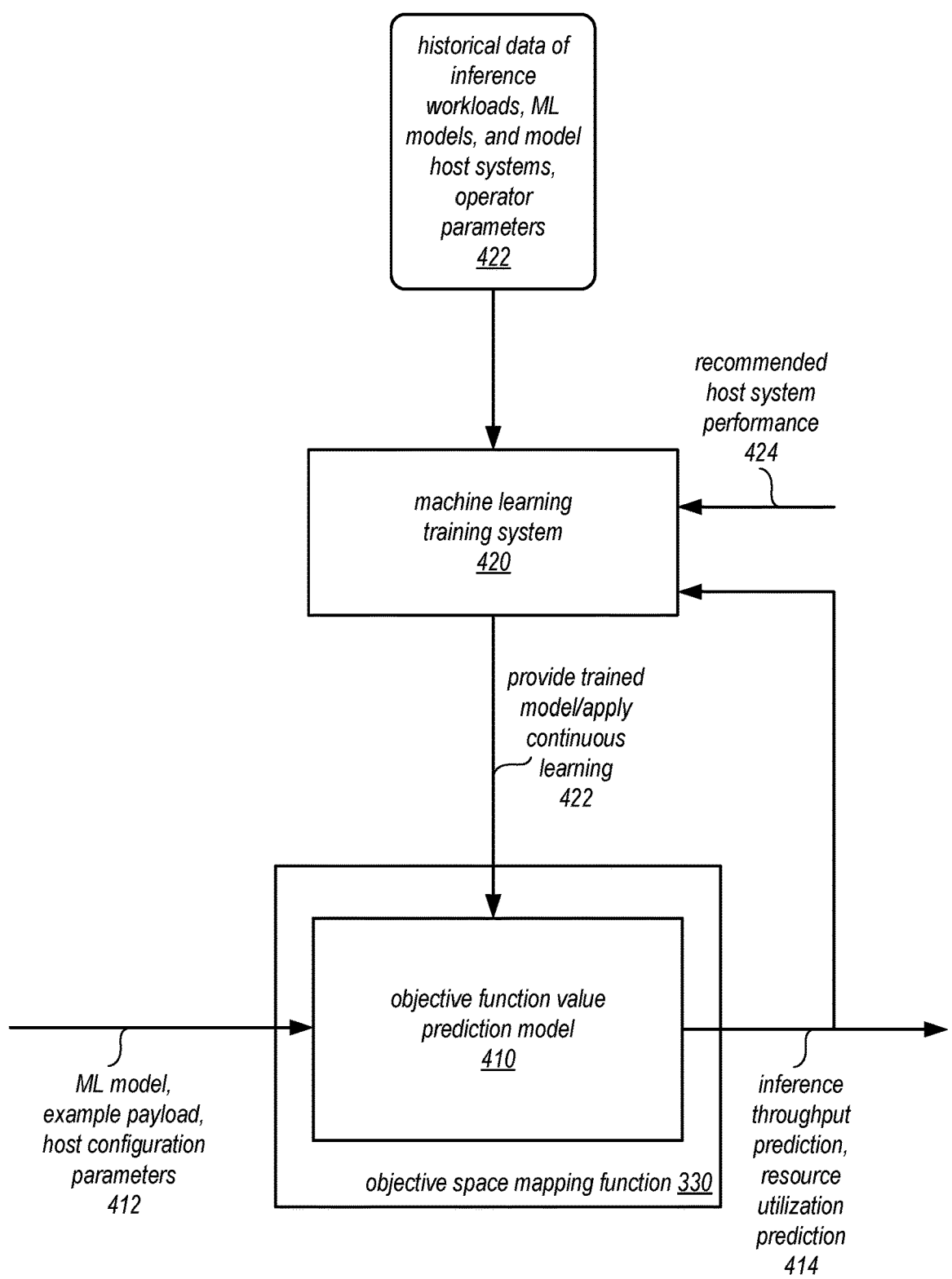
FIG. 4 is a logical block diagram that illustrates objective space mapping training for generating machine learning model host system recommendations using multi-objective optimization, according to some embodiments.

FIG. 4 is a logical block diagram that illustrates objective space mapping training for generating machine learning model host system recommendations using multi-objective optimization, according to some embodiments. As discussed above, objective space mapping function 330 may provide objective function values for a given machine learning model, example payload, and host configuration parameters. While in some embodiments, similarity indexes or various other comparison techniques may be implemented, in at least some embodiments, a trained machine learning model may be implemented.

For example, as illustrated in FIG. 4, objective function value prediction model 410 may be implemented for object space mapping function 330. The objective function value prediction model may be, for example, a neural network that is trained to encode input (e.g., hardware or other configuration parameters of a machine learning host system, such as geographic location) as a feature vector or other representation. For example, host configuration parameters may each have a corresponding feature of the vector (e.g., instance type, amount of memory, processor capacity, specialized hardware). The machine learning model may also be featurized. For example, if the machine learning model is tree-based (e.g., decision tree) a depth of tree of the tree may be feature. For neural networks, the number of parameters and structure/layers/number and shape of filters may be features. For ensemble trained machine learning models, a number of learners may be a feature. Other features can include the number of hyperparameters that can be tuned, or a Vapnik-Chervonenkis (VC) dimension feature that is a measure of the capacity of a set of functions learned by a statistical binary classification algorithm dimension can be a feature. Example payload features can be size, number of items, quality or other encoding attribute, or various other payload attributes. According to these features obtained from the input ML model, example payload, and host configuration parameters 412, objective function value prediction model 410 may be trained to predict inference throughput and resource utilization, as indicated at 414.

Machine learning training system 420 may be utilized, in some embodiments to train and provide 422 objective function value prediction model 410. For example, historical data of inference workloads (e.g., including payloads or payload features), machine learning models, model host systems, and operator parameters (e.g., availability of different types of host systems according to different types of operators of the machine learning model) may be maintained or tracked (e.g., by machine learning service 210). This historical data 422 may be used to provide a training set to apply a supervised learning technique to train objective function value prediction model 410.

such as a time limit, a number of iterations, or a resource utilization limitation (e.g., a cost) for generating a host system recommendation In some embodiments, continuous learning techniques may be applied to update objective function value prediction model 410 to adapt to new information (e.g., new performance information, new machine learning models, new workloads, and/or new host systems). For example, the predicted inference throughput and resource utilization may be compared with actual recommend host system performance 424 (which may be received from host systems) and then used to update the objective function value prediction model 410.

Figure 5:
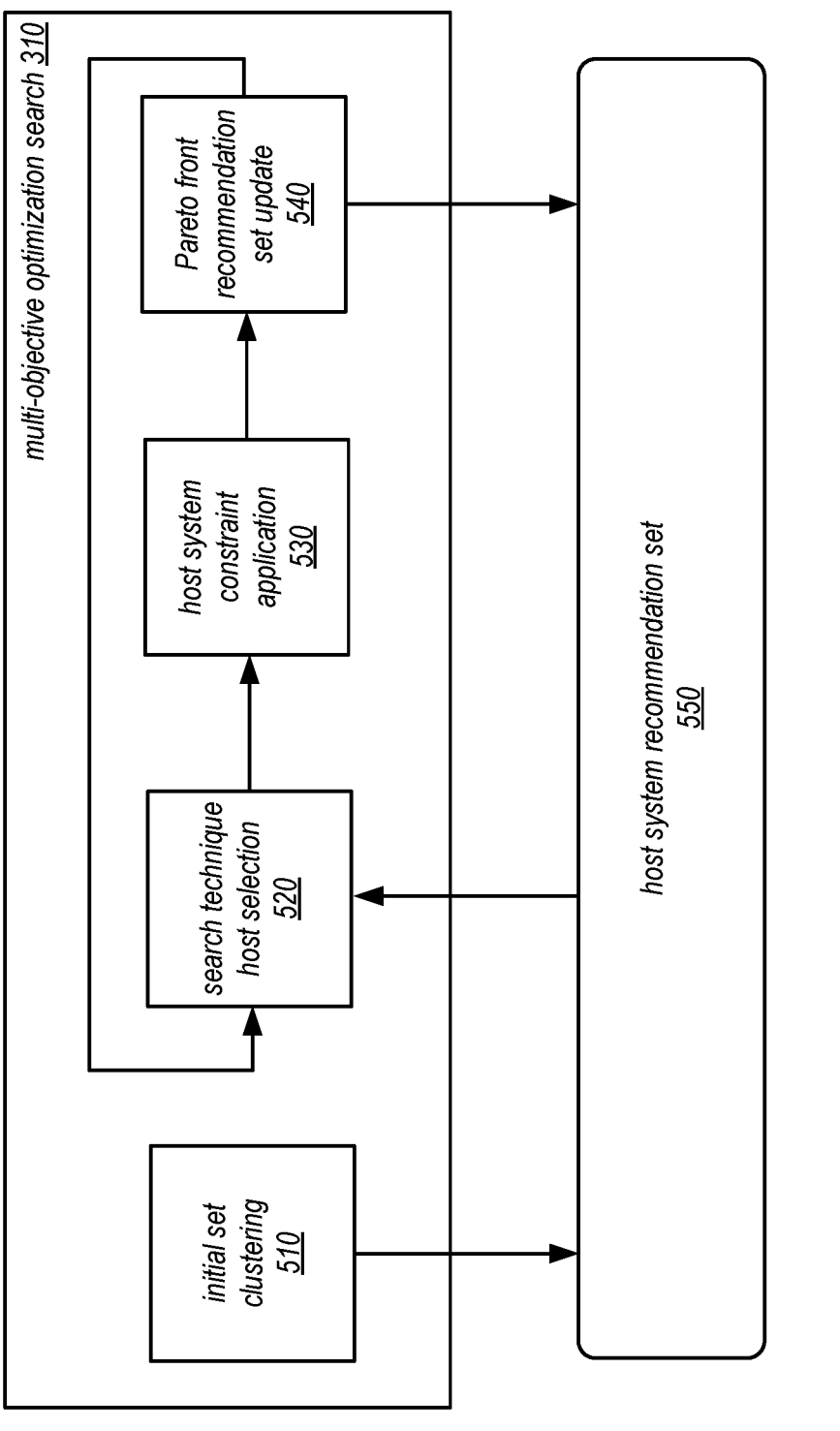
FIG. 5 is a logical block diagram that illustrates model host system search for generating machine learning model host system recommendations using multi-objective optimization, according to some embodiments.

FIG. 5 is a logical block diagram that illustrates model host system search for generating machine learning model host system recommendations using multi-objective optimization, according to some embodiments. In at least some embodiments, multi-objective optimization search 310 may implement initial set clustering 510. Initial set clustering may take the machine learning model and example payload and compare them with historical payloads and machine learning model performed on different host systems to determine an initial set for host system recommendation set 550. Various different clustering techniques may be performed, including density based, distribution-based, or hierarchical. Some examples include k-means, fuzzy k-means, DBSCAN, Gaussian mixture models, and Expectation-Maximization (EM). In some embodiments, cross-entropy clustering may be implemented. Such clustering techniques may measure the similarity between different combinations of different machine learning model-payload performance to identify groups of similar machine-learning model-payload performs as clusters. As noted earlier, clustering techniques may be used as a standalone recommendation technique in some embodiments which may be utilized in addition to or instead of multi-objective optimization to provide host recommendation set 550.

Multi-objective optimization search 310 may perform iterative search using may different search techniques that select further host systems for consideration based on the host system recommendation set 550, as indicated at 520. For example, a differential evolution technique may be implemented in some embodiments as the search technique. For example, in differential evolution a two-stage search may be performed. A broad search, self-adaptive exploration, may be performed that takes different hosts in the recommendation set 550, and then identifies a new host system based on some combination of host systems in the recommendation set (e.g., by determining a difference between parameters and scaling the difference, using a larger scaling factor, such as by adding memory, processor, or other decision configuration parameter according to the scaled difference to select a new host system for consideration with those configuration parameters determined by the combination). A second stage of the search, the self-adaptive exploitation may then be performed. This may be a localized search, that again takes that takes different hosts in the recommendation set 550, and then identifies a new host system based on some combination of host systems in the recommendation set (e.g., by determining a difference between parameters and scaling the difference, using a smaller scaling factor, such as by adding memory, processor, or other decision configuration parameter according to the scaled difference to select a new host system for consideration with those configuration parameters determined by the combination).

In other embodiments, ant colony optimization or particle swarm optimization may be implemented. For instance, in ant colony optimization, the search technique for finding the optimal host system configuration may be implemented by representing the decision variable space as a graph G. Each artificial ant starts from a source node in the graph (e.g., a randomly chosen host configuration) and moves forward toward the destination that maximizes the multi-objective function space. As the artificial ants move forward, they build a solution by choosing the next node to continue their tour from their current location on the graph. This selection of node is done probabilistically from the available neighbor nodes. Each path of the graph has been assigned a variable called the artificial pheromone trail (where the artificial pheromone trail is analogous the pheromone trail that ants leave to guide other ants to a destination such that the greater the amount of pheromone the greater the number of ants have and will use the trail which indicates that the trail is likely the most optimal to the destination). Initially the amount of pheromone trail is the same for all of the paths. The probability of selection is controlled by artificial pheromone density, with the choice being biased toward the paths marked by stronger pheromone deposited in previous tours of the ants in graph.

For particle swarm optimization, different host system configurations may be a population of candidate solutions that are considered to be "particles." To perform an iterative search technique, these "particles" are moved around in the decision variable space according to a heuristic based on the "particle's" position and velocity. Each "particle's" movement may be influenced by its local best known position and also the best known positions in the decision variable space. These best know positions may be found and updated by other "particles". Moving "particles" in this way, may move the swarm of "particles" toward the best host system configurations.

As indicated at 530, the newly selected hosts may be filtered or otherwise considered according to host system constraint application 530. For example, some host systems may not be available to certain users (e.g., as different operators may have access to different configurations or types of host system than other operators). These unavailable host systems may be excluded from recommendation set 550. Similarly, as discussed above, recommendation request specified constraints, such as resource utilization limits may be applied to exclude host systems that would violate those constraints. Although indicated as being performed after search technique 520, host system constraint application can be performed during search technique host selection 520 (e.g., by applying host constraints as a negative weight, score, or other influence that downgrades selecting host system configurations that violate a constraint) or prior to performing multi-objective optimization search 310 (e.g., by removing the host system configurations from consideration in the search space.

As indicated at 540, a Pareto front recommendation set update may be performed. For example, the Pareto-optimal host systems in the host system recommendation set may be identified and added (or retained) in host system recommendation set as discussed above with regard to FIG. 1, by finding the Pareto optimal situations where no change can be found (e.g., in the configuration parameters) that leads to an improvement (e.g., greater maximization of inference throughput and minimization of resource utilization) where no action or allocation is available in the decision variable space 140 (e.g., a change to a configuration parameter of a host system) that makes a host system perform better in one objective without performing worse in the other objective (e.g., a change that increases inference throughput but causes greater resource utilization, or vice versa). A Pareto front may then be determined as the set of each host system that is in a Pareto-optimal situation. Multi-objective optimization search 310 may then stop search when the termination condition is satisfied.

Figure 6A:
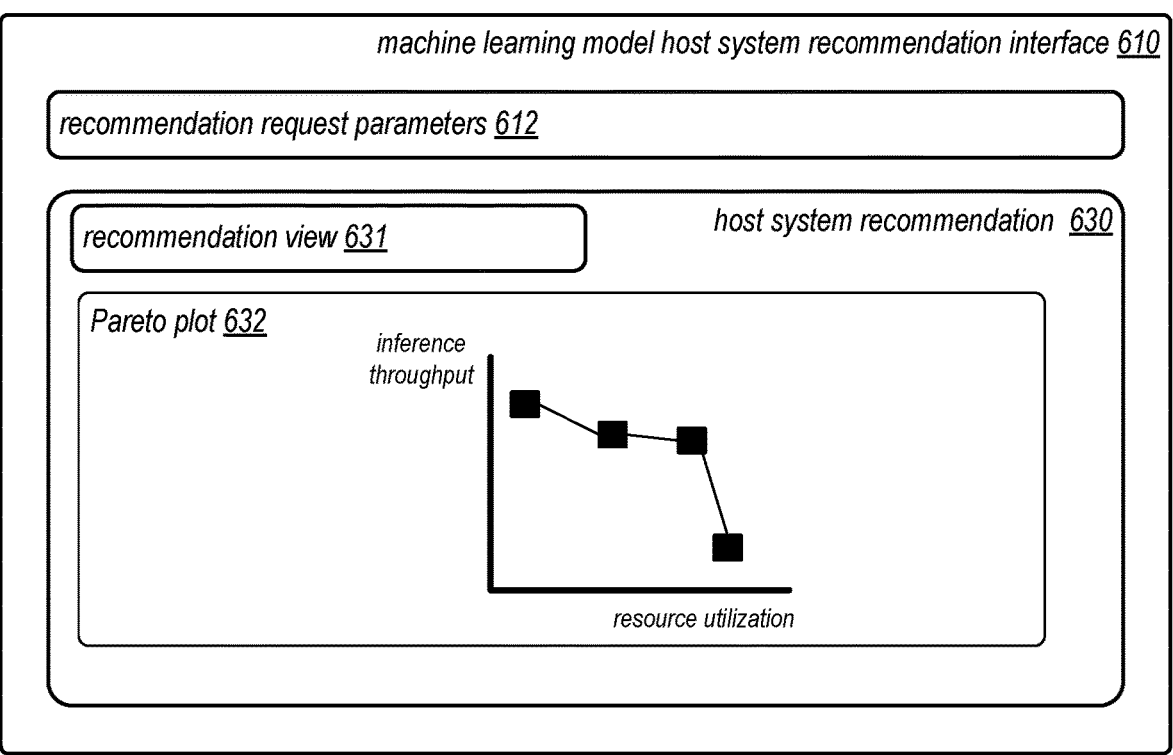
FIGS. 6A-6C illustrates example displays of model host system recommendations, according to some embodiments.
Figure 6B:
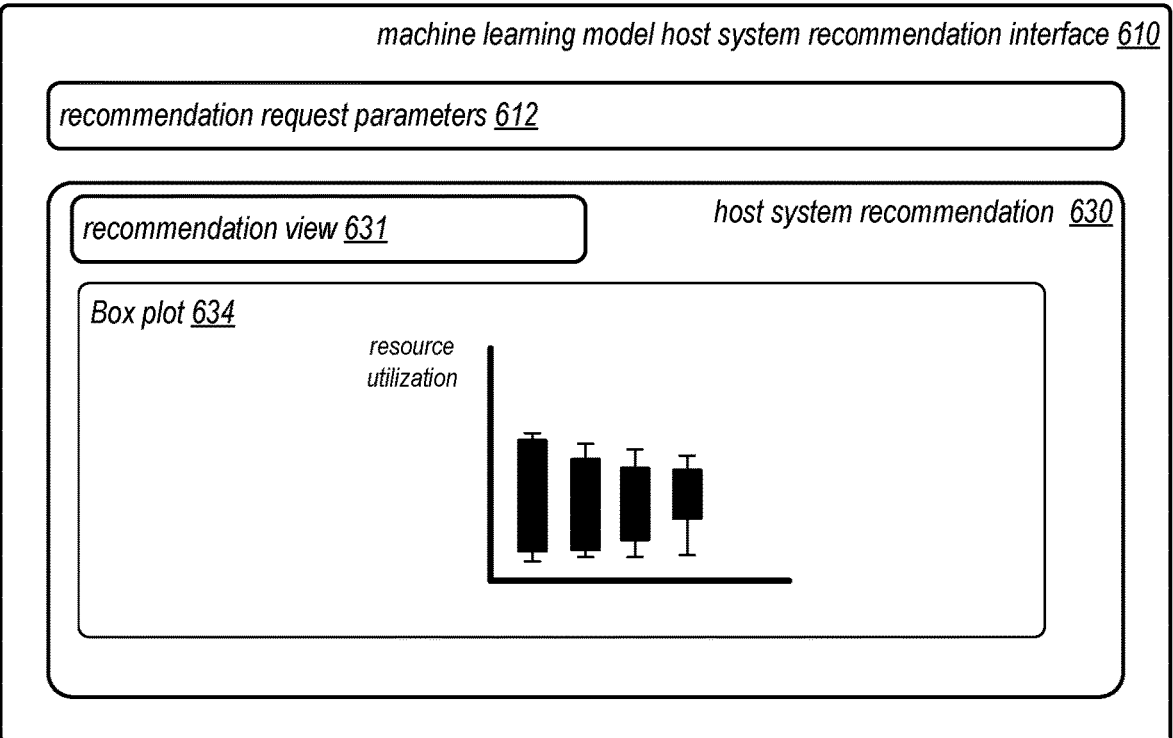
Figure 6C:
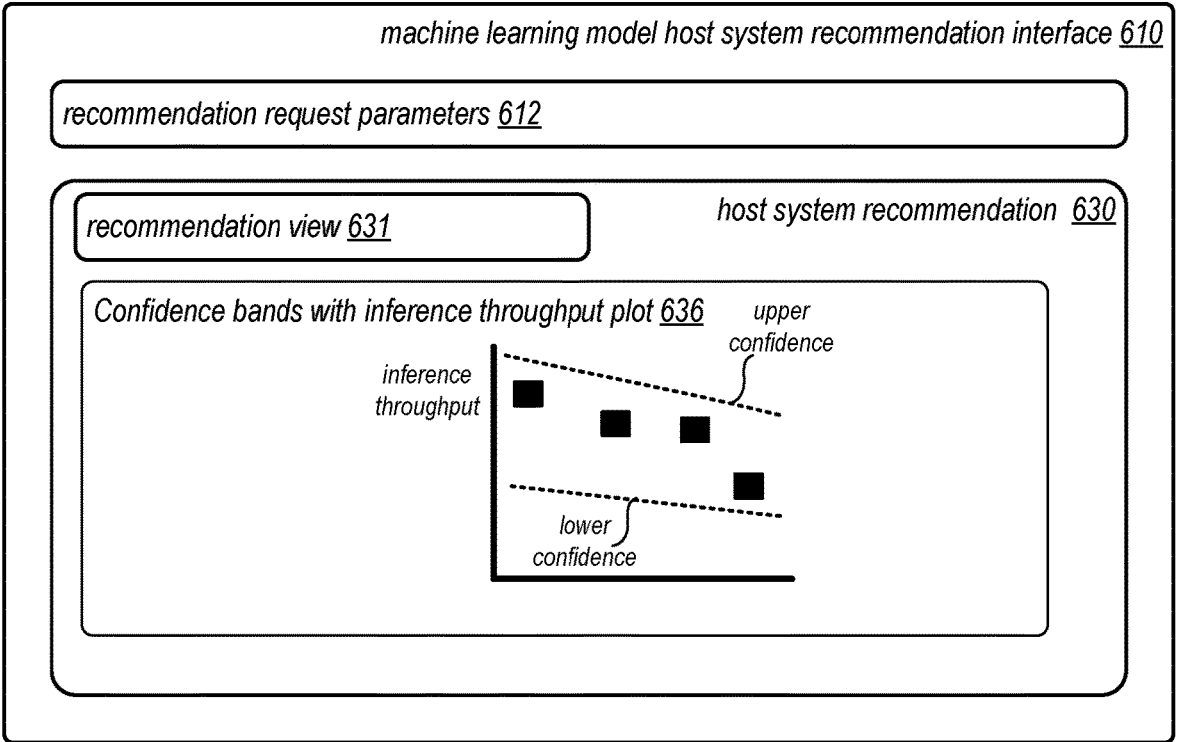

FIGS. 6A-6C illustrates example displays of model host system recommendations, according to some embodiments. In FIG. 6A, machine learning model host system recommendation interface 610 to receive a request for recommendation for a machine learning model using recommendation request parameters 612 (e.g., as depicted in FIG. 3 request 340). When the recommendation is generated it may be displayed at 630. Different recommendation views may be selected to understand the tradeoffs between the different host systems. For instance, in FIG. 6A, a Pareto plot 632 illustrating the Pareto front is illustrated. In FIG. 6B, another view, Box plot 634 is illustrated. In FIG. 6C, another view, confidence boundaries for upper and lower confidence 636

(e.g., upper and lower quartile boundaries) in addition to the inference throughput predictions.

Although FIGS. 2-6C have been described and illustrated in the context of a provider network implementing a machine learning service, the various components illustrated and described in FIGS. 2-6C may be easily applied to other machine learning systems that use multi-objective optimization to generation machine learning model host system recommendations. As such, FIGS. 2-6C are not intended to be limiting as to other embodiments.

FIG. 7 is a high-level flowchart illustrating various methods and techniques for generating machine learning model host system recommendations using multi-objective optimization, according to some embodiments. As indicated at 710, a machine learning model is identified for a host system recommendation to host the machine learning model and use the machine learning model to generate an inference according to an example inference request for the machine learning model, in some embodiments. For example, a request may be received or some other indication provided that identifies one machine learning model out of many different available machine learning models to use for generating the host system recommendation, as discussed above with regard to FIG. 3. In some embodiments, the machine learning model may be selected out of a catalog or other service that provides a searchable and selectable set machine learning models offered by one entity for the deployment and use of another entity.

As indicated at 720, multi-objective optimization is iteratively performed that starts from an initial set of host systems as a recommendation set of host systems for the host system recommendation, with objectives to minimize resource utilization and maximize inference throughput for the example inference request, in some embodiments. Although performing multi-objective optimization that pursues objectives to minimize resource utilization and maximize inference throughput may not guarantee minimal resource utilization and maximum inference throughput, such techniques may provide an efficient search strategy in scenarios where a large number of possible configurations exist and may provide an approximation of these objectives in various embodiments. In some embodiments, a random selection of different possible host system configurations may be used to determine the initial set of host systems. In some embodiments, a clustering technique, such as the clustering techniques discussed above with regard to FIG. 5 may use the machine learning model and example payload to identify the initial set of host systems.

As indicated at 722, based on the recommendation set of host systems, further host system(s) are identified to add to the recommendation set of host systems according to a search technique, in some embodiments. Various different search techniques may be used. Differential evolution, ant colony optimization, or particle swarm optimization, are some examples of different search techniques that can explore the decision variable space of different host system configurations in the initial set of host systems to select the additional host system(s) to add, as discussed above.

As indicated at 724, respective inference throughput values and resource utilization values are generated for the machine learning model to generate the inference given the example payload at individual ones of the recommendation set of host systems using a mapping function to objective space that takes as input respective configuration parameters for the individual ones of the recommendation set of host systems to generate the respective inference throughput values and resource utilization values, in some embodiments. A similarity index is one example of implementing the mapping function. For instance, host system configuration parameters, as discussed in the examples above, machine learning model features and example payload features can be used to generate a similarity value (or values) which indicate which one of an indexed set host system configurations for machine learning models and payload performances are most similar to the individual recommended host systems being considered for the machine learning model and example payload so that the corresponding performance information (e.g., inference throughput and resource utilization) is mapped to the respective host systems. A Jaccard index is one example of a similarity index that can be implemented. In some embodiments, as discussed above with regard to FIG. 5, a machine learning model (e.g., a neural network) can be trained to predict the inference throughput values and resource utilization given a host system configuration, machine learning model and example inference request.

As indicated at 726, a Pareto front of host systems in the recommendation set of host systems is determined according to the respective inference throughput values and resource utilization values of the recommendation set of host systems, in some embodiments. As discussed above with regard to FIG. 1, by finding the Pareto optimal situations where no change can be found (e.g., in the configuration parameters) that leads to an improvement (e.g., greater maximization of inference throughput and minimization of resource utilization) where no action or allocation is available in the decision variable space 140 (e.g., a change to a configuration parameter of a host system) that makes a host system perform better in one objective without performing worse in the other objective (e.g., a change that increases inference throughput but causes greater resource utilization, or vice versa). A Pareto front may then be determined as the set of each host system that is in a Pareto-optimal situation.

As indicated at 728, a termination condition is evaluated. For example, a time limit, limit on a number of iterations, or a resource utilization limitation (e.g., a cost) for generating a host system recommendation may be evaluated and if exceeded, the termination condition may be considered to be satisfied. If not satisfied, then another iteration of search may be performed. If satisfied, then, host system(s) determined to be on the Pareto front of host systems are selected and the selected host system(s) provided in the host system recommendation, as indicated at 730. Host systems on the Pareto front could, for example be selected according to a host system's location between the two different optimization objectives, such as between maximum inference throughput and minimum resource utilization. Different configurations of the host system recommendations may be provided. For example, a single host system configuration may be provided that maximizes inference throughput according to the Pareto front. In some embodiments, multiple host system configurations may be displayed or otherwise provided. As discussed above with regard to FIGS. 6A-6C, various different visualizations or other techniques for communicating the tradeoffs between different host system configurations as identified along the Pareto front may be provided. In some embodiments, a recommendation may be used to automate deployment of the machine learning model to a host system selected from the Pareto front. In some embodiments, host systems on the Pareto front may be selectable by via a user interface so that deployment may be initiated on a host system, in some embodiments.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
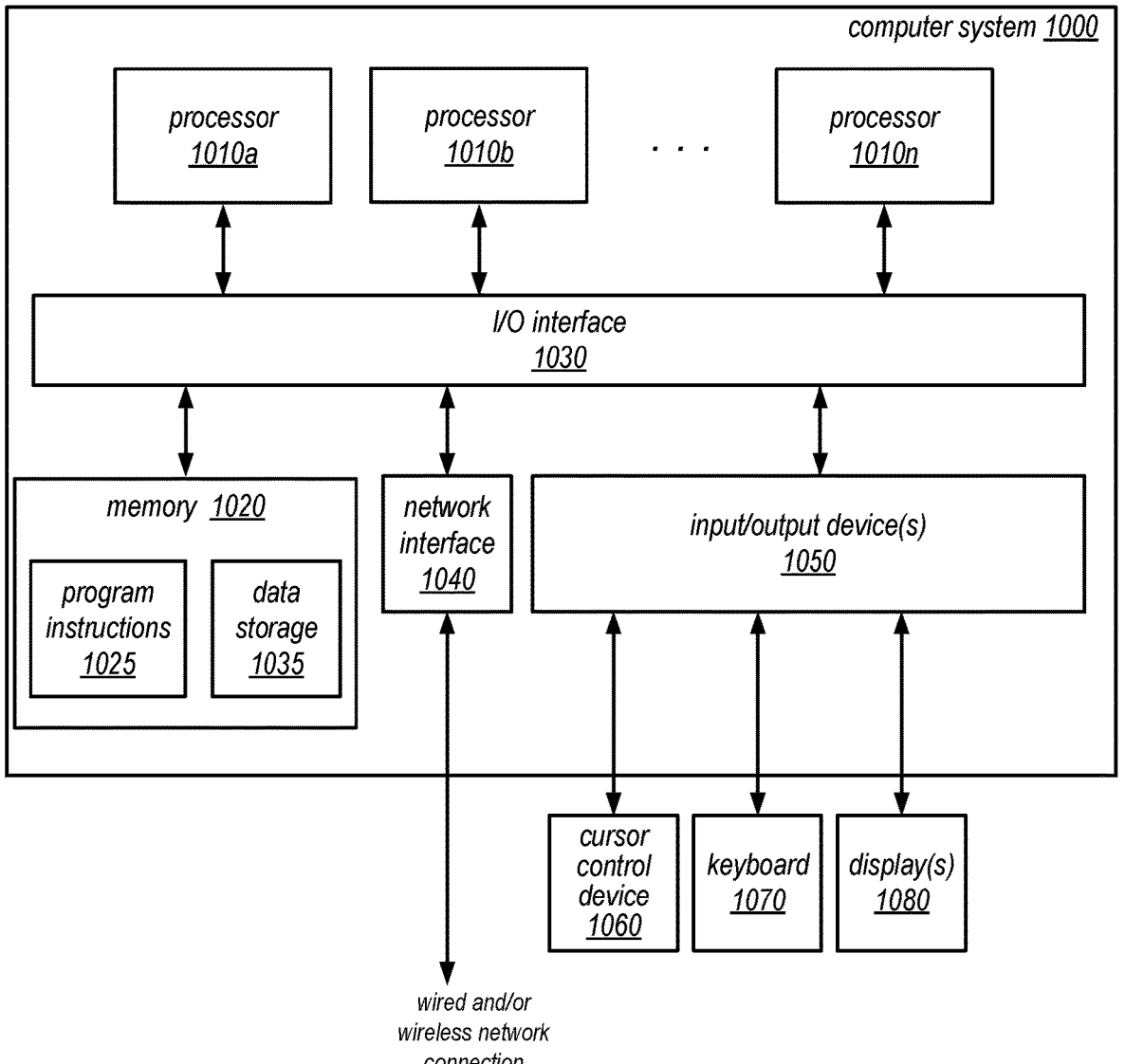
FIG. 8 illustrates an example system to implement the various methods, techniques, and systems described herein, according to some embodiments.

Embodiments of generating machine learning model host system recommendations as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/ output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system

1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a machine learning model host recommendation system, configured to:

receive request for a recommendation of a provider network host system to host a machine learning model and generate an inference using the machine learning model, wherein the request for the recommendation includes an example inference request for the machine learning model;

determine an initial set of provider network host systems that are added to a recommendation set of provider network host systems;

iteratively perform multi-objective optimization that starts from the initial set of provider network host systems as a recommendation set of provider network host systems for the provider network host system recommendation, with objectives to minimize resource utilization and maximizes inference throughput for the example inference request until a termination condition is satisfied, wherein to perform the multi-objective optimization, the machine learning model host recommendation system is configured to:

based on the recommendation set of provider network host systems, identify one or more further provider network host systems to add to the recommendation set of provider network host systems according to a search technique;

generate respective inference throughput values and resource utilization values for the machine learning model to generate the inference given the example inference request at individual ones of the recommendation set of provider network host systems using a mapping function to objective space that takes as input respective configuration parameters for the individual ones of the recommendation set of provider network host systems to generate the respective inference throughput values and resource utilization values; and determine a Pareto front of provider network host systems in the recommendation set of provider network host systems according to the respective inference throughput values and resource utilization values of the recommendation set of provider network host systems; and select one or more host systems determined to be on the Pareto front;

return a provider network host system recommendation that includes the selected one or more host systems responsive to the request.

2. The system of claim 1, wherein the mapping function to objective space is a performance prediction machine learning model that predicts the respective inference throughput values and the resource utilization values for the machine learning model to generate the inference given the example inference request.

3. The system of claim 1, wherein to determine the initial set of provider network host systems that are added to a recommendation set of provider network host systems, the machine learning model host recommendation system is configured to apply a clustering technique that compares the machine learning model and example inference request with historical data collected for other inference requests for generating inferences using the machine learning model.

4. The system of claim 1, wherein the machine learning model is one of a plurality of machine learning models offered as part of a catalog of machine learning models by the provider network.

5. A method, comprising:

identifying a machine learning model for a host system recommendation to host the machine learning model and use the machine learning model to generate an inference according to an inference request for the machine learning model;

iteratively performing multi-objective optimization that starts from an initial set of host systems as a recommendation set of host systems for the host system recommendation, with objectives to minimize resource utilization, and maximize inference throughput for the example inference request until a termination condition is satisfied, wherein performing the multi-objective optimization comprises:

based on the recommendation set of host systems, identifying one or more further host systems to add to the recommendation set of host systems according to a search technique;

generating respective inference throughput values and resource utilization values for the machine learning model to generate the inference given the example inference request at individual ones of the recommendation set of host systems using a mapping function to objective space that takes as input respective configuration parameters for the individual ones of the recommendation set of host systems to generate the respective inference throughput values and resource utilization values; and determining a Pareto front of host systems in the recommendation set of host systems according to the respective inference throughput values and resource utilization values of the recommendation set of host systems; and selecting one or more host systems included the Pareto front to include in the host system recommendation; and providing the host system recommendation including the one or more selected host systems.

6. The method of claim 5, wherein the mapping function to objective space is a performance prediction machine learning model that predicts the respective inference throughput values and the resource utilization values for the machine learning model to generate the inference given the example inference request.

7. The method of claim 6, further comprising updating the performance prediction machine learning model that predicts the respective inference throughput values and the resource utilization values using a continuous learning technique based, at least in part, on recommended host system performance data.

8. The method of claim 5, wherein identifying the one or more further host systems to add to the recommendation set of host systems according to the search technique comprises applying differential evolution as the search technique, wherein applying differential evolution comprises scaling differences between different ones of the recommendation set of hosts to identify the one or more further host systems.

9. The method of claim 5, wherein iteratively performing multi-objective optimization that starts from an initial set of host systems as a recommendation set of host systems for the host system recommendation further comprises applying one or more host system constraints to exclude at least one host system from the host system recommendation set.

10. The method of claim 5, wherein the one or more host system constraints are specified in a request to generate the host system recommendation.

11. The method of claim 5, further comprising applying a clustering technique that compares the machine learning model and example inference request with historical data collected for other inference requests for generating inferences using the machine learning model to determine the initial set of host systems.

12. The method of claim 5, wherein providing the host system recommendation comprises generating a visualization of the Pareto front to include as part of the host system recommendation.

13. The method of claim 5, wherein the termination condition is specified in a request to generate the host system recommendation.

14. One or more non-transitory, computer-readable storage media, storing program instructions that when executed on or across one or more computing devices cause the one or more computing devices to implement:

receiving a host system recommendation request to host a machine learning model and generate an inference using the machine learning model, wherein the request includes an example inference request for the machine learning model;

iteratively performing multi-objective optimization that starts from an initial set of host systems as a recommendation set of host systems for the host system recommendation, with objectives to minimize resource utilization and maximize inference throughput for the example inference request until a termination condition is satisfied, wherein, in performing the multi-objective optimization, the program instructions cause the one or more computing devices to implement:

determining an initial set of host systems that are added to a recommendation set of host systems;

based on the recommendation set of host systems, identifying one or more further host systems to add to the recommendation set of host systems according to a search technique;

generating respective inference throughput values and resource utilization values for the machine learning model to generate the inference given the example inference request at individual ones of the recommendation set of host systems using a mapping function to objective space that takes as input respective configuration parameters for the individual ones of the recommendation set of host systems to generate the respective inference throughput values and resource utilization values; and determining a Pareto front of host systems in the recommendation set of host systems according to the respective inference throughput values and resource utilization values of the recommendation set of host systems; and selecting one or more host systems included the Pareto front to include in the host system recommendation; and providing the host system recommendation including the one or more selected host systems responsive to the request.

15. The one or more non-transitory, computer-readable storage media of claim 14, wherein the mapping function to objective space is a performance prediction machine learning model that predicts the respective inference throughput values and the resource utilization values for the machine learning model to generate the inference given the example inference request.

16. The one or more non-transitory, computer-readable storage media of claim 14, storing further program instructions that when executed by the one or more computing devices cause the one or more computing devices to further implement applying one or more host system constraints to exclude at least one host system from the host system recommendation set.

17. The one or more non-transitory, computer-readable storage media of claim 16, wherein the one or more host system constraints are based on availability of the host system for a user account of a provider network associated with a request to generate the host system recommendation.

18. The one or more non-transitory, computer-readable storage media of claim 14, storing further program instructions that when executed on or across the one or more computing devices, cause the one or more computing devices to further implement apply a clustering technique that compares the machine learning model and example inference request with historical data collected for other inference requests for generating inferences using the machine learning model to determine the initial set of host systems.

19. The one or more non-transitory, computer-readable storage media of claim 14, wherein in wherein providing the host system recommendation, the program instructions cause the one or more computing devices to further implement generating a box plot visualization of different host systems to include as part of the host system recommendation.

20. The one or more non-transitory, computer-readable storage media of claim 14, storing further program instructions that when executed on or across the one or more computing devices, cause the one or more computing devices to further implement:

receiving a different host system recommendation request for a different machine learning model to generate a different inference given a different example inference request for the different machine learning model;

applying a clustering technique that compares the different machine learning model and example inference request with historical data collected for other inference requests for generating inferences using the different machine learning model to determine one or more host systems to recommend for the different example inference request for the different machine learning model.

* * * * *